(12) United States Patent
Seils

(10) Patent No.: US 8,521,397 B2
(45) Date of Patent: Aug. 27, 2013

(54) HYBRID DRIVE HAVING VALVE DEACTIVATION

(75) Inventor: Wolfgang Seils, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 850 days.

(21) Appl. No.: 12/312,098

(22) PCT Filed: Oct. 22, 2007

(86) PCT No.: PCT/EP2007/061255
§ 371 (c)(1),
(2), (4) Date: Jan. 13, 2010

(87) PCT Pub. No.: WO2008/064961
PCT Pub. Date: Jun. 5, 2008

(65) Prior Publication Data
US 2010/0121554 A1 May 13, 2010

(30) Foreign Application Priority Data
Nov. 27, 2006 (DE) .................... 10 2006 055 800

(51) Int. Cl.
*F02D 43/00* (2006.01)
*F02D 17/02* (2006.01)

(52) U.S. Cl.
USPC ..................... 701/102; 123/198 F

(58) Field of Classification Search
USPC ...... 701/102, 107, 110, 112–115; 123/192.1, 123/198 F, 478–481, 490; 180/65.1, 65.225, 180/65.28, 65.265
See application file for complete search history.

(56) References Cited

U.S. PATENT DOCUMENTS

| | | | |
|---|---|---|---|
| 4,481,841 A * | 11/1984 | Abthoff et al. | 74/661 |
| 6,223,846 B1 * | 5/2001 | Schechter | 180/165 |
| 6,886,524 B2 * | 5/2005 | Hanada et al. | 123/198 F |
| 7,530,413 B2 * | 5/2009 | Rayl | 180/65.25 |
| 2004/0001763 A1 * | 1/2004 | Rush | 417/269 |
| 2004/0147364 A1 * | 7/2004 | Wakashiro et al. | 477/3 |
| 2005/0038576 A1 * | 2/2005 | Hara et al. | 701/22 |
| 2005/0257967 A1 | 11/2005 | Vahabzadeh et al. | |
| 2008/0305932 A1 * | 12/2008 | Karnjate et al. | 477/184 |
| 2009/0133662 A1 * | 5/2009 | Hartmann et al. | 123/198 DC |
| 2009/0301086 A1 * | 12/2009 | Ralston | 60/620 |
| 2010/0305837 A1 * | 12/2010 | Gagliano | 701/111 |

FOREIGN PATENT DOCUMENTS

| | | |
|---|---|---|
| DE | 10 2005 001047 | 7/2006 |
| DE | 10 2005 001245 | 7/2006 |
| EP | 1 236 604 | 9/2002 |
| WO | WO 2005/045217 | 5/2005 |

* cited by examiner

Primary Examiner — John T. Kwon
Assistant Examiner — Johnny Hoang
(74) Attorney, Agent, or Firm — Kenyon & Kenyon LLP

(57) ABSTRACT

A hybrid drive has at least one internal combustion engine having at least two cylinders, as well as at least one electric machine having at least one electric motor function and at least one generator function. The hybrid drive is arranged so as to operate all the cylinders of the at least one internal combustion engine in a full-load operation and so as to shut down at least one of the at least two cylinders in at least one part-load operation, at least one additional one of the at least two cylinders of the at least one internal combustion engine being operated. In the at least one part-load operation, the at least one shut-down cylinder has pressure applied to it, e.g., an overpressure by a combustion mixture that was combusted last.

11 Claims, 5 Drawing Sheets

HYBRID DRIVE HAVING VALVE DEACTIVATION

BACKGROUND OF THE INVENTION

1. Field of the Invention

The present invention relates to a hybrid drive and a method of operating a hybrid drive.

2. Description of Related Art

Various types of motor vehicles having hybrid drives are known from the related art. Such hybrid drives usually have at least one internal combustion engine and at least one electric machine. The at least one electric machine is able to be individually switched on and off during operation. Furthermore, an additional energy store is provided which is normally one or more batteries and/or accumulators. The electric machine is supplied with electrical energy from the energy store. Conversely, electrical energy is able to be recovered from the electric machine and stored again in the energy store, in response to a so-called braking energy recuperation, for example.

One problem concerning the connection of the at least one internal combustion engine to the at least one electric machine is that, as a rule, a separating clutch and/or a costly transmission has to be provided between these two drive units, in order to be able to operate the different motor(s)/engine(s) independently of one another. Such separating clutches and/or transmissions are costly, however, and heavy, and take up a comparatively large required space. It would therefore be desirable to be able to operate the internal combustion engine in a "stepwise" manner in its operating state. Such "stepwise" operating modes are known from the related art, from the branch of pure combustion engines, and are based on the principle of valve deactivation. Thus, internal combustion engines are already commercially available which may be run in part-load operation, in which not all the cylinders present are operated. Only one-half the number of cylinders is normally operated, in this context. Thus, in V engines, an operating mode is known, for instance, in which one may work by shutting down one bank, since, in such a case, a whole cylinder bank is shut down in a part-load operation. In general, every other cylinder in the ignition sequence is shut down, so that frequently one speaks of an half-engine operation (HEO).

Design attempts are known from the related art that aim to transfer the principle of cylinder cutoff to hybrid drives. Thus, published US patent application 2005/0257967 describes a drive train for a hybrid drive. The hybrid drive has an internal combustion engine having a plurality of cylinders, which in each case have a plurality of deactivatable intake and exhaust valves. The valves are able to be deactivated using a control unit. Consequently, the rotor of the electric motor of the hybrid drive is able to be continuously operatively connected with the crankshaft of the internal combustion engine, so that one may do without a corresponding clutch.

In practice, however, the device shown in published US patent application 2005/0257967 demonstrates a decisive disadvantage which is that, when individual cylinders are deactivated, oil is sucked from the crank housing into the combustion chamber. As a result, when the previously deactivated cylinder is started again, in particular, increased pollutant emission occurs, as well as a transiently deteriorated efficiency.

BRIEF SUMMARY OF THE INVENTION

According to the present invention, therefore, a hybrid drive and a method for controlling a hybrid drive are provided, as well as a corresponding computer program, using which the disadvantages of the devices known from the related art are able to be avoided.

The hybrid drive proposed has at least one internal combustion engine having at least two cylinders. Furthermore, at least one electric machine having at least one electric motor function and at least one generator function is provided. Depending on the design of the hybrid drive (e.g. parallel hybrid, branched hybrid drive) the at least one electric motor function and the at least one generator function may be provided in separate components or even in one and the same component.

The hybrid drive is arranged so as to be operated in a full-load operation, in which all the cylinders of the at least one internal combustion engine are operated. Moreover, at least one part-load operation is provided, in which at least one of the at least two cylinders is shut down and in which at least one additional of the at least two cylinders of the at least one internal combustion engine is operated. In the at least one part-load operation, the at least one shut down cylinder has pressure applied to it, especially an overpressure owing to the most recently combusted combustion mixture. This application of pressure may take place particularly in that, during deactivation of the at least one cylinder that is to be shut down, it has combustion mixture applied to it, and after that an ignition process is started, the valves of the at least one cylinder being closed, so that the at least one cylinder has applied to it an overpressure caused by combustion gases.

At least one load regulator and/or at least one engine control unit is advantageously provided, which are designed to ascertain a setpoint power and/or a setpoint rotational speed and/or a setpoint torque of the at least one internal combustion engine, and to select, corresponding to this ascertained characteristic, the full-load operation and/or a part-load operation as the suitable operating mode.

It is advantageous that one may then do without a coupling element and/or a power transfer unit between the at least one internal combustion engine and the at least one electric machine. If it is nevertheless decided to provide a coupling element and/or a power transfer unit, one may provide a two-step or multi-step transmission, for instance, which has at least one step assigned to full-load operation and at least one additional step assigned to the at least one part-load operation. Alternatively or in addition, it may also be provided that, in the at least one part-load operation, the remaining cylinders that are not shut down (i.e. are activated) are operated fully or partially at a higher load (i.e., for example, a farther opened throttle valve), so that pumping losses and throttling losses are reduced overall. This also brings about a higher efficiency in the part-load operation.

The fact that, in principle, the design approach of the present invention makes unnecessary the separation between the at least one internal combustion engine and the at least one electric machine, brings with it various advantages. Thus, as was described above, doing without a separating clutch may go along with considerable savings in weight, costs and required space. Furthermore, one may do without a costly control of the separating clutch for switching over in a torque-neutral, that is, jolt-free manner between the different operating modes.

Since the at least one internal combustion engine, as a rule, keeps running even in the deactivated case, a starting phase and/or a reset-in phase into full-load operation is able to be designed to be shorter than in the case of a start from a standstill. This also improves and simplifies the switchover between the different operating modes and improves the exhaust gas response.

An additional advantage is that auxiliary assemblies (e.g. an air conditioning compressor connected to the internal combustion engine) which up to now have corresponded to the related art, may remain with the at least one internal combustion engine, since the latter may be designed in such a way that it constantly keeps running.

As far as a user is concerned, the combination of the at least one electric machine and the at least one internal combustion engine, having the at least one cylinder that is able to be shut down, behaves like a usual internal combustion engine. Consequently, a usual automatic transmission and/or a usual manual transmission may also be used.

The proposed application of pressure to the at least one deactivated cylinder, which is able to take place in the manner described, using subsequent ignition and/or even the application of an external gas or in other ways (e.g. by a partial piston stroke), has the effect of greatly diminished pollutant emission of the proposed hybrid drive. Particularly in the starting phase and/or the resetting phase into full-load operation, the proposed device and operating manner react considerably faster than the usual systems, and has proven to be more economical in consumption.

All in all, the proposed hybrid drive is quite compatible with current internal combustion engine concepts and builds up on known technologies. This adaptation of known technologies has the effect that development costs, or rather modification costs for adaptation to existing systems are able to be lowered considerably.

DETAILED DESCRIPTION OF THE INVENTION

Figure 1A:
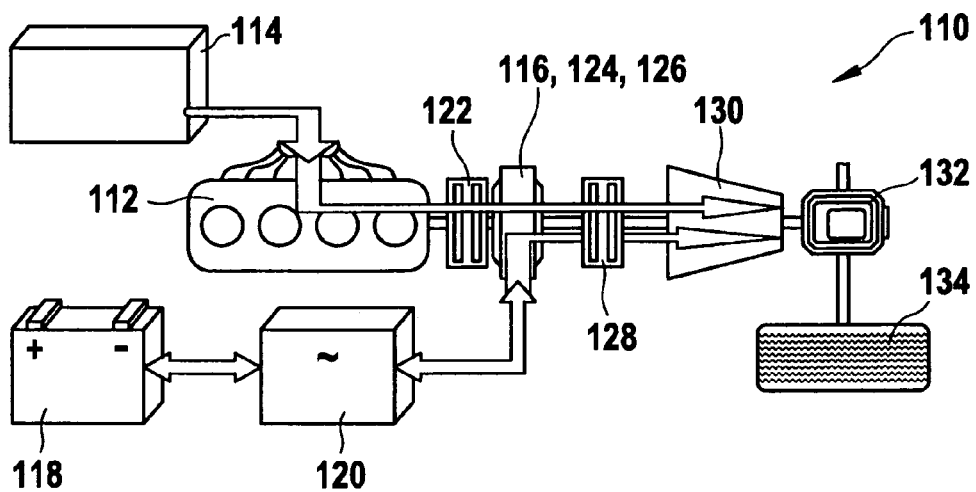
FIGS. 1A to 1D show exemplary embodiments of known hybrid drive concepts.
Figure 1B:
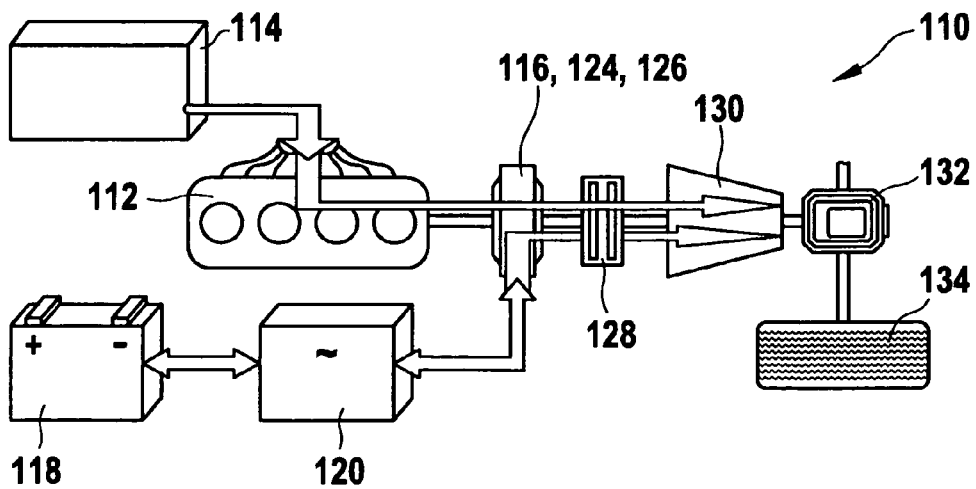
Figure 1C:
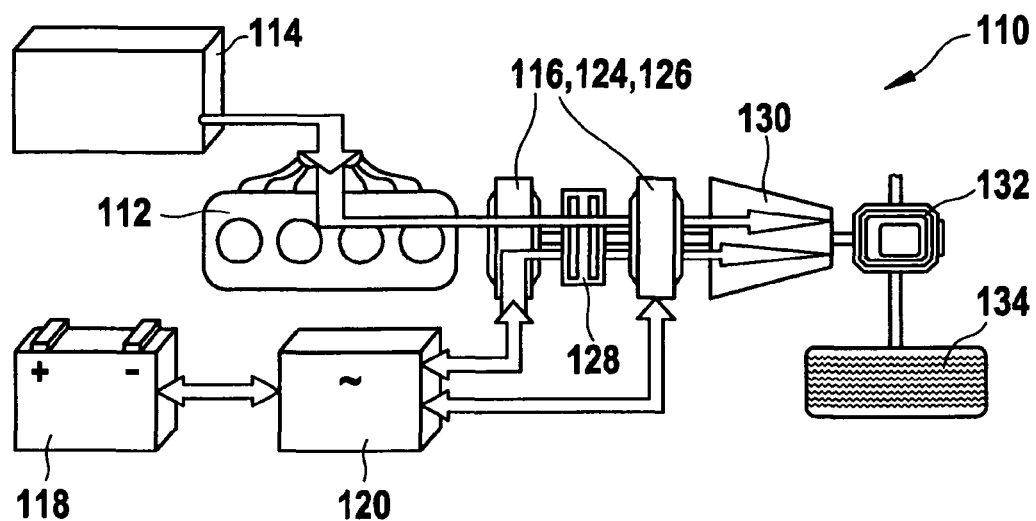
Figure 1D:
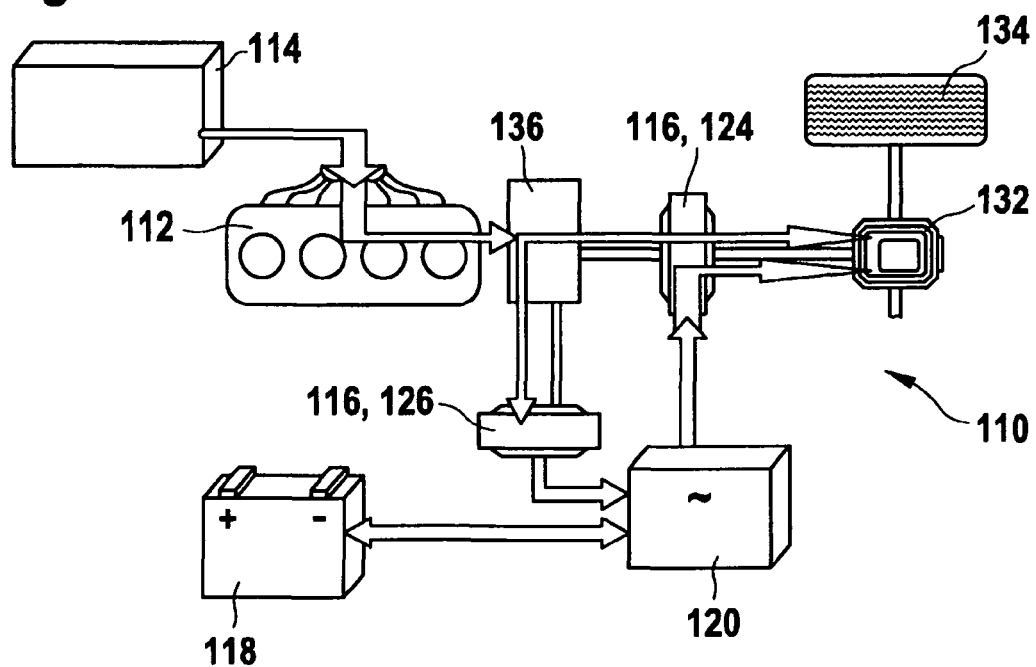

Various exemplary embodiments of hybrid drives 110 are shown in FIGS. 1A to 1D, which, in principle, are known from the related art. In this context, the exemplary embodiments in FIGS. 1A and 1B show parallel hybrid systems, the exemplary embodiment in FIG. 1C shows a serial parallel hybrid system and the exemplary embodiment in FIG. 1D shows a branched hybrid system.

What all hybrid systems have in common is an internal combustion engine 112 supplied with fuel from a fuel tank 114. In addition, an electric machine 116 is provided which, depending on the exemplary embodiment, may be designed differently, as well as an energy store in the form of a battery 118 and an electrical converter 120.

In the parallel hybrid exemplary embodiment shown in FIG. 1A, a drive of internal combustion engine 112 is connected, in a separable manner, via a first coupling element 122 to electric machine 116. In the exemplary embodiment, as shown in FIG. 1A, this electric machine 116 unifies the two functions of an electric motor 124 for driving the motor vehicle and a generator function 126 for charging battery 118 via electric converter 120. Depending on the operating mode of hybrid drive 110, either electric motor function 124 is supplied with electric energy by battery 118 or, in generator operation, generator function 126 charges battery 118 (e.g. in a braking energy recuperation) via electric converter 120.

Electric machine 116 is connected to a drive 130 via a second coupling element 128. This may be a continuous variable transmission (CVT), for instance, or an electric CVT, (ECVT). On the drive side, transmission 130 is finally connected to at least one drive wheel 134 via an axle drive 132.

In FIG. 1B, a so-called "soft" hybrid drive 110 is shown, in which, in contrast to the design in FIG. 1A, first coupling element 122 between internal combustion engine 112 and electric machine 116 is omitted. Accordingly, internal combustion engine 112 and electric machine 116 are permanently connected to each other. Electric machine 116, especially while starting and stopping, acts to support the drive or to perform braking energy recuperation. A shift in the load point of hybrid drive 110 is possible within a limited range.

FIG. 1C shows another specific embodiment of a hybrid drive 110, which in turn represents a modification of hybrid drive 110 according to FIG. 1B. In it, an additional electric machine 116 is fitted in between second coupling element 128 and drive 130, which again possesses an electric motor function 124 and a generator function 126. Whereas electric machine 116 on the internal combustion engine side is able to be separated from drive 130 via second coupling element 128, electric machine 116 on the drive side is connected to drive 130 even in decoupled operation, so that this one may be used particularly advantageously, for instance, for braking energy recuperation. Hybrid drive 110 shown in FIG. 1C, which is also designated as a "strong" hybrid drive, consequently represents a variant which may be utilized only during stopping and starting of the motor vehicle, but which also makes possible driving electrically. A load point shift is also possible.

Finally, FIG. 1D shows an exemplary embodiment of a branched hybrid drive 110. In this exemplary embodiment the two functions of electric machine 116, namely, electric motor function 124 and generator function 126 are developed separately. In this instance, internal combustion engine 112 is connected to a planetary gear 136, which, in turn, is connected to the drive of electric motor function 124. Electric motor function 124, on its part, is connected to axle drive 132 via its own drive.

Moreover, planetary gear 136 is connected to the drive of generator function 126, so that battery 118 is able to be charged via generator function 126 and electrical converter 120. In addition to the operating possibilities offered by the system in FIG. 1C, hybrid drive 110 according to the exemplary embodiment in FIG. 1D, also offers the possibility of a rotational speed shift, since the rotational speed may be set via planetary gear 136.

The implementations represented in FIGS. 1A to 1D represent only a part of the technical possibilities, and they show the different expenditures for the different implementations and the operational possibilities yielded thereby, whose aim is to bring about savings in fuel. One may see that, in all exemplary embodiments, there is a subdivision, or rather a switchover of a torque generation by electric machine 116 and internal combustion engine 112, via (at least) one coupling element 122, 128 or a power transfer unit (in this case, for instance, in the form of a planetary gear 136) This coupling element 122, 128 or power transfer unit is also necessary in order to operate electric machine 116 both in electric motor function 124 and in generator function 126, in order to make possible energy recuperation and energy storage in battery 118 shown, in overrun and braking operation.

Figure 2:
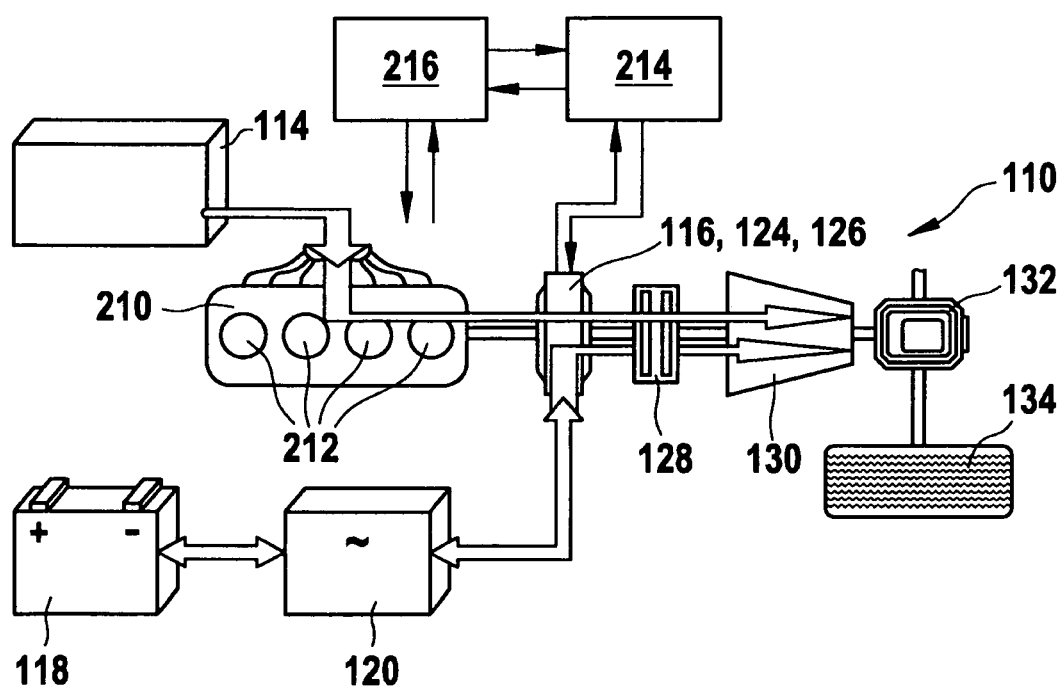
FIG. 2 shows an exemplary embodiment of a hybrid drive according to the present invention and of a method for operating same.

FIG. 2 shows a design according to the present invention of a hybrid drive 110 having an internal combustion engine 210 having deactivatable cylinders 212. Apart from the fact that the individual cylinders 212 of internal combustion engine 210 are able to be deactivated (for instance, individually and/or as a bank), the construction of the hybrid drive 110 according to FIG. 2 corresponds to the exemplary embodiment described above in the exemplary embodiment according to FIG. 1B, so that one may refer to a great extent to this exemplary embodiment for the collaboration of the components.

Furthermore, hybrid drive 110 in the exemplary embodiment according to FIG. 2 has a load regulator 214 and an engine control unit 216. The load regulator is designed to ensure optimal utilization of electric machine 116 as electric motor function 124 or generator function 126, corresponding to a requirement (e.g. current speeds, rotational speeds and/or acceleration commands). Engine control unit 216, in turn, is designed to control internal combustion engine 210 corresponding to a power requirement. Load regulator 214 and engine control unit 216 may be implemented as separate modules, or as different functionalities of one and the same module. For example, the separation may be implemented by various computer program modules in a microcontroller (e.g. an embedded system). The activation and deactivation of individual cylinders 212 of internal combustion engine 210 may be performed by load regulator 214 or, preferably, by engine control unit 216.

The idea in principle of the design, according to the present invention, is to combine internal combustion engine 210 having switchable cylinders 212 (preferably individual) with electric machine 116 to form a known hybrid drive construction. Consequently, at least two operating modes are conceivable, namely, a full-load operation, in which all cylinders 212 are operated, and at least one part-load operation, in which at least one cylinder 212 is shut down. A minimum-load operation is also conceivable, in which internal combustion engine 210 is completely shut down, so that the torque generation is then completely taken over by electric machine 116. In this case, electric machine 116 is able to play the role of a bank, that is not shut down, of an internal combustion engine 210, that is operated in piston stroke mode (half-engine operation, see above). In the remaining travel states, electric machine 116 is able to be operated, motorically supportive for load point shift of the internal combustion engine or generatorically in the overrun or braking operation for energy recuperation and vehicle electrical system securing. Along with that, similar possibilities come about, such as the parallel hybrid shown above, the difference being that basically no separating clutches (122 in FIG. 1A) are needed.

In response to the implementation of internal combustion engine 210 having switchable cylinders 212, various possibilities come about, one being able, to a great extent, to refer back to systems known from the related art. Examples of such internal combustion engines 210 are shown in FIGS. 3A and 3B.

Figure 3A:
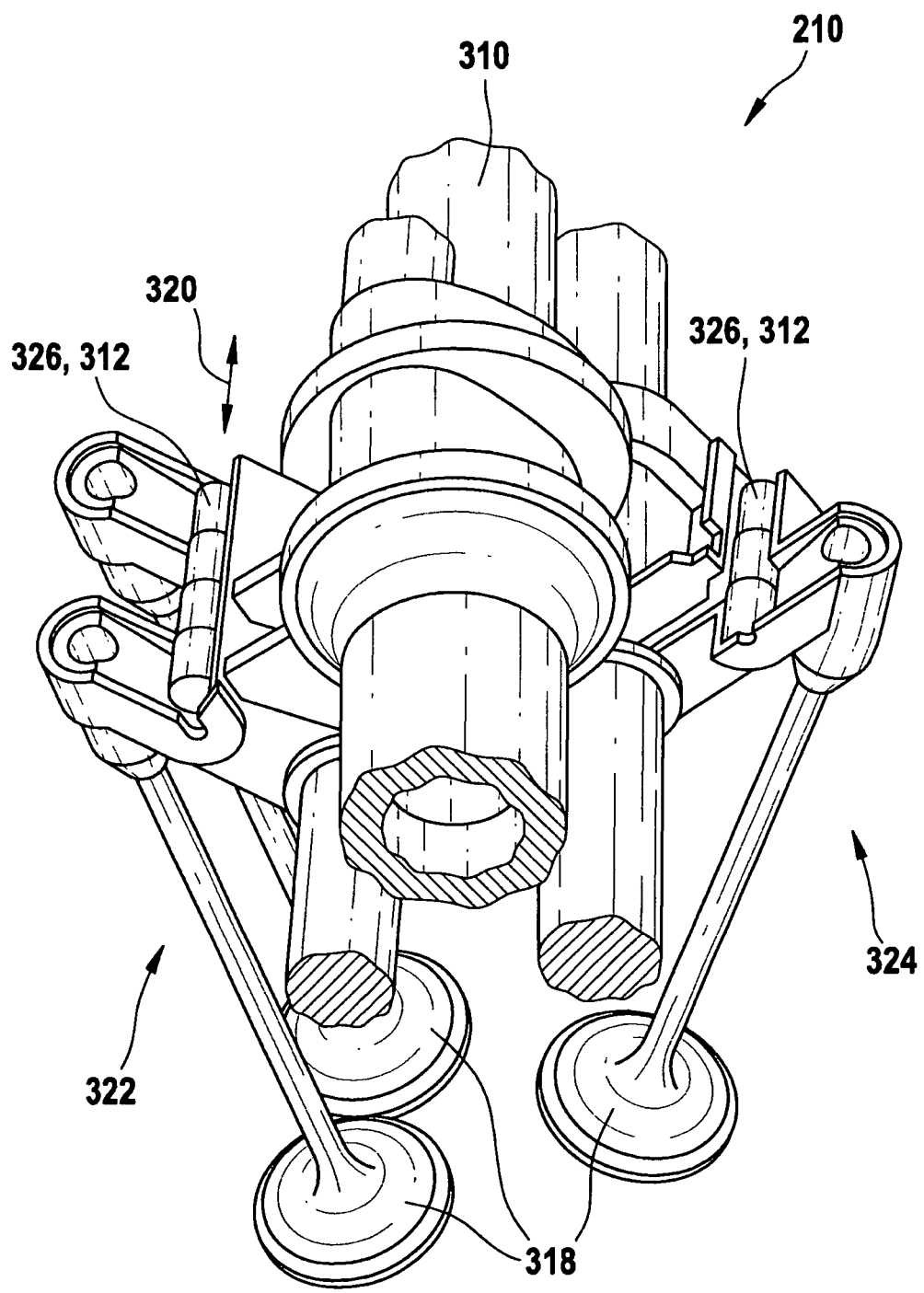
FIGS. 3A and 3B show two examples of technical possibilities for shutting down individual cylinders.

In the example shown in FIG. 3A, a camshaft 310 is connected to valves 318 of cylinders 212 (that are not completely shown in FIG. 3A), via a locking piston 312 and primary lever and secondary lever. Locking pistons 312 are equipped with different diameters, so that when locking pistons 312 are displaced in the shifting direction that is designated symbolically by reference numeral 320 in FIG. 3A, in one position, force transmission takes place from camshaft 310 to valve 318, but not in another shifting position. In this way, individual ones of the two valve banks 322, 324 may specifically be switched on or off. Thus, in this exemplary embodiment, locking pistons 312 act as actuators 326 for switching cylinders 212 on and off.

Figure 3B:
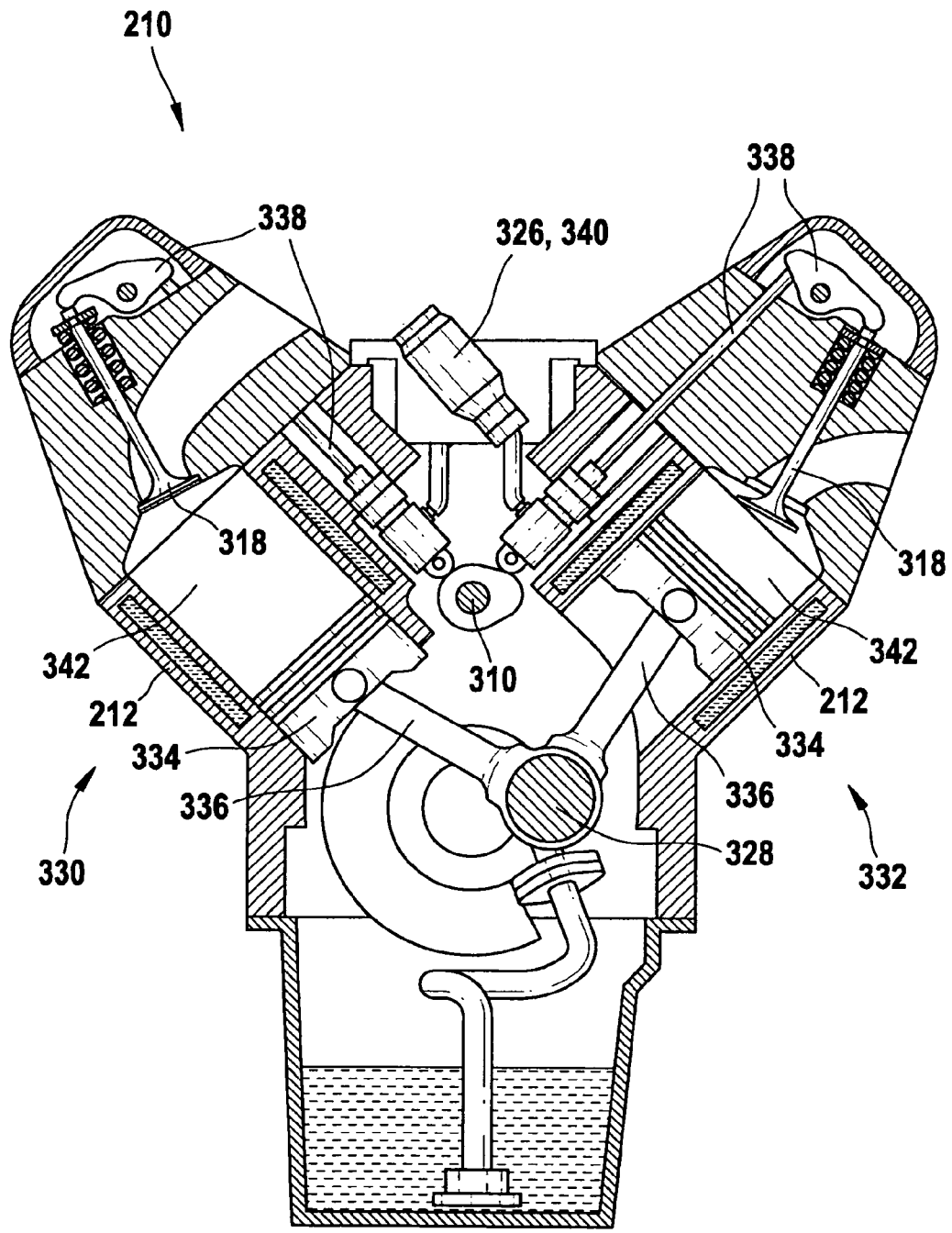

FIG. 3B shows a second example of an internal combustion engine 210 having switchable cylinders 212 in a sectional representation. In the exemplary embodiment shown in FIG. 3B, a V engine is involved having a crankshaft 328 and two cylinder banks 330, 332, whose cylinder pistons 334 are respectively connected to crankshaft 328 via connecting rods 336.

Furthermore, in internal combustion engine 210 according to FIG. 3B, a camshaft 310 is again provided which controls valves 318 of the two cylinder banks 330, 332 via a hydraulic lever connection 338.

In contrast to actuator 326 according to the exemplary embodiment in FIG. 3A, that is developed as a locking piston 312, in the exemplary embodiment according to FIG. 3B actuator 326 is designed as an electrohydraulic actuator 340, which particularly includes a solenoid valve for the pressure relief of lever connection 338. In this way, for example, individual hydraulic tappets of lever connection 338 may be relieved of pressure, so that no force transmission takes place from camshaft 310 to valves 318. Hybrid drive 110 is advantageously operated, particularly via an appropriate design of load regulator 214 and/or engine control unit 216, in such a way that when an individual cylinder 212 is shut down, combustion chamber 342 has an overpressure applied to it. In this manner, it is prevented that oil is able to get from the crank housing surrounding crankshaft 328 into combustion chamber 342. For this purpose, before the shut-down process, combustion chamber 342 advantageously once more has applied to it combustion mixture, and an ignition process is started in the presence of closed valves 318 (compression stroke). The combustion gases created in this context apply an overpressure (power strokes) to cylinders 212 that are to be shut down. Thereafter, using the actuators 326 described, corresponding cylinder 212 (or a group of cylinders 212) are shut down and separated from camshaft 310, so that an exhausting of the combustion gases (exhaust stroke) does not take place. With that, the combustion gases remain in combustion chamber 342 until the at least one cylinder 212 is needed again, based on a torque requirement (e.g. based on a driver's command and/or a requirement by engine control unit 216 and/or load regulator 214).

Besides actuators 326 described in FIGS. 3A and 3B, additional concepts of actuators are possible, in order to switch on or off a force transmission between camshaft 310 and cylinders 212 in a targeted manner.

What is claimed is:

1. A hybrid drive for a motor vehicle, comprising:
at least one internal combustion engine having at least two cylinders; and
at least one electric machine having at least one electric motor function and at least one generator function;
wherein the hybrid drive is configured to: a) operate all of the at least two cylinders of the at least one internal combustion engine in a full-load operation, and b) deactivate at least one of the at least two cylinders and operate at least one remaining cylinder of the at least two cylinders in at least one part-load operation, and wherein, in the at least one part-load operation, the at least one deactivated cylinder is subjected to an overpressure generated by a combustion mixture which was combusted immediately prior to deactivation.

2. The hybrid drive as recited in claim 1, further comprising:
at least one of a load regulator and an engine control unit configured to: a) ascertain at least one of a setpoint power, a setpoint rotational speed, and a setpoint torque of the at least one internal combustion engine; and b) to select one of the full-load operation or the part-load operation corresponding to the at least one of the ascertained setpoint power, setpoint rotational speed, and setpoint torque.

3. The hybrid drive as recited in claim 2, wherein the hybrid drive is configured as a parallel hybrid system having the at least one internal combustion engine connected directly to the at least one electric machine without interposition of one of a coupling element or a power transfer unit.

4. The hybrid drive as recited in claim 2, wherein at least one transmission having at least two steps is provided between the at least one internal combustion engine and the at least one electric machine, the transmission having at least one first step associated with the full-load operation and at least one additional, further step associated with the at least one part-load operation.

5. The hybrid drive as recited in claim 2, wherein the hybrid drive is configured to operate the at least one operating cylinder in the at least one part-load operation at a greater load than in the full-load operation.

6. The hybrid drive as recited in claim 2, further comprising:
   at least one actuator associated with the at least one internal combustion engine, wherein the at least one actuator is configured to deactivate at least one cylinder of the at least one internal combustion engine.

7. The hybrid drive as recited in claim 6, wherein the at least one actuator is configured to interrupt at least one power transmission between at least one camshaft of the at least one internal combustion engine and at least one valve of the at least one internal combustion engine.

8. The hybrid drive as recited in claim 6, wherein the at least one actuator has at least one of a locking piston and an electromechanical converter.

9. A method for controlling a hybrid drive having at least one internal combustion engine with at least two cylinders and at least one electric machine with at least one electric motor function and at least one generator function, comprising:
   selectively providing at least one part-load operation and at least one full-load operation;
   wherein, in the at least one full-load operation, all the cylinders of the at least one internal combustion engine are operated; and
   wherein, in the at least one part-load operation, at least one cylinder of the at least one internal combustion engine are shut down and at least one remaining cylinder is operated, and the at least one deactivated cylinder is subjected to a pressure generated by a combustion mixture which was combusted immediately prior to deactivation.

10. The method as recited in claim 9, wherein during the shut down of the at least one cylinder, a combustion mixture is applied to the at least one cylinder being shut down, an ignition process is started, and valves of the at least one cylinder remain closed, whereby overpressure is applied by combustion gasses to the at least one cylinder being shut down.

11. A computer-readable storage medium storing a computer program having a plurality of program codes which, when executed on a computer, performs a method for controlling a hybrid drive having at least one internal combustion engine with at least two cylinders and at least one electric machine with at least one electric motor function and at least one generator function, the method comprising:
   selectively providing at least one part-load operation and at least one full-load operation;
   wherein, in the at least one full-load operation, all the cylinders of the at least one internal combustion engine are operated; and
   wherein, in the at least one part-load operation, at least one cylinder of the at least one internal combustion engine are shut down and at least one remaining cylinder is operated, and the at least one deactivated cylinder is subjected to a pressure generated by a combustion mixture which was combusted immediately prior to deactivation.

* * * * *

UNITED STATES PATENT AND TRADEMARK OFFICE
CERTIFICATE OF CORRECTION

PATENT NO.        : 8,521,397 B2
APPLICATION NO. : 12/312098
DATED             : August 27, 2013
INVENTOR(S)       : Wolfgang Seils It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Fifteenth Day of September, 2015

Michelle K. Lee
*Director of the United States Patent and Trademark Office*